United States Patent [19]

Middleton

[11] Patent Number: 5,520,006
[45] Date of Patent: May 28, 1996

[54] AIRFLOW AND DEFROSTING SYSTEM FOR REFRIGERATION SYSTEMS AND APPARATUS

[75] Inventor: Richard T. Middleton, Northfield, Minn.

[73] Assignee: Northfield Freezing Systems, Inc., Northfield, Minn.

[21] Appl. No.: 284,832

[22] Filed: Aug. 2, 1994

[51] Int. Cl.[6] ............................................. F25D 21/06
[52] U.S. Cl. .............................. 62/80; 62/152; 62/278; 62/380
[58] Field of Search .......................... 62/80, 81, 152, 62/155, 234, 199, 200, 277, 278, 378, 380, 337

[56] References Cited

U.S. PATENT DOCUMENTS

| | | | |
|---|---|---|---|
| 3,103,796 | 9/1963 | Dickson et al. | 62/199 X |
| 3,365,902 | 1/1968 | Nussbaum | 62/155 |
| 3,531,945 | 10/1970 | Brennan | 62/234 |
| 5,056,327 | 10/1991 | Lammert | 62/151 |
| 5,157,935 | 10/1992 | Gregory | 62/278 |

FOREIGN PATENT DOCUMENTS

| | | | |
|---|---|---|---|
| 5-60449 | 3/1993 | Japan | 62/152 |
| 8403138 | 9/1984 | WIPO | 62/152 |

OTHER PUBLICATIONS

W. F. Stoecker "Industrial Refrigeration" Business News Publishing Company Troy, Michigan, 1988, pp. 178–180.

*Primary Examiner*—Harry B. Tanner
*Attorney, Agent, or Firm*—Haugen and Nikolai

[57] ABSTRACT

An automated processing freezer system is described that provides a plurality of cooling units to chill the air within a freezing enclosure, whereby the coils of each cooling unit may be defrosted independently, without louvers or other moving mechanisms, while the cooling output of the freezer system is maintained 24 hours a day. Baffles in the freezing enclosure isolate each cooling unit from the airflow associated with the other cooling units, thereby eliminating the need for expensive and less efficient louvers surrounding the coils of each cooling unit.

10 Claims, 7 Drawing Sheets

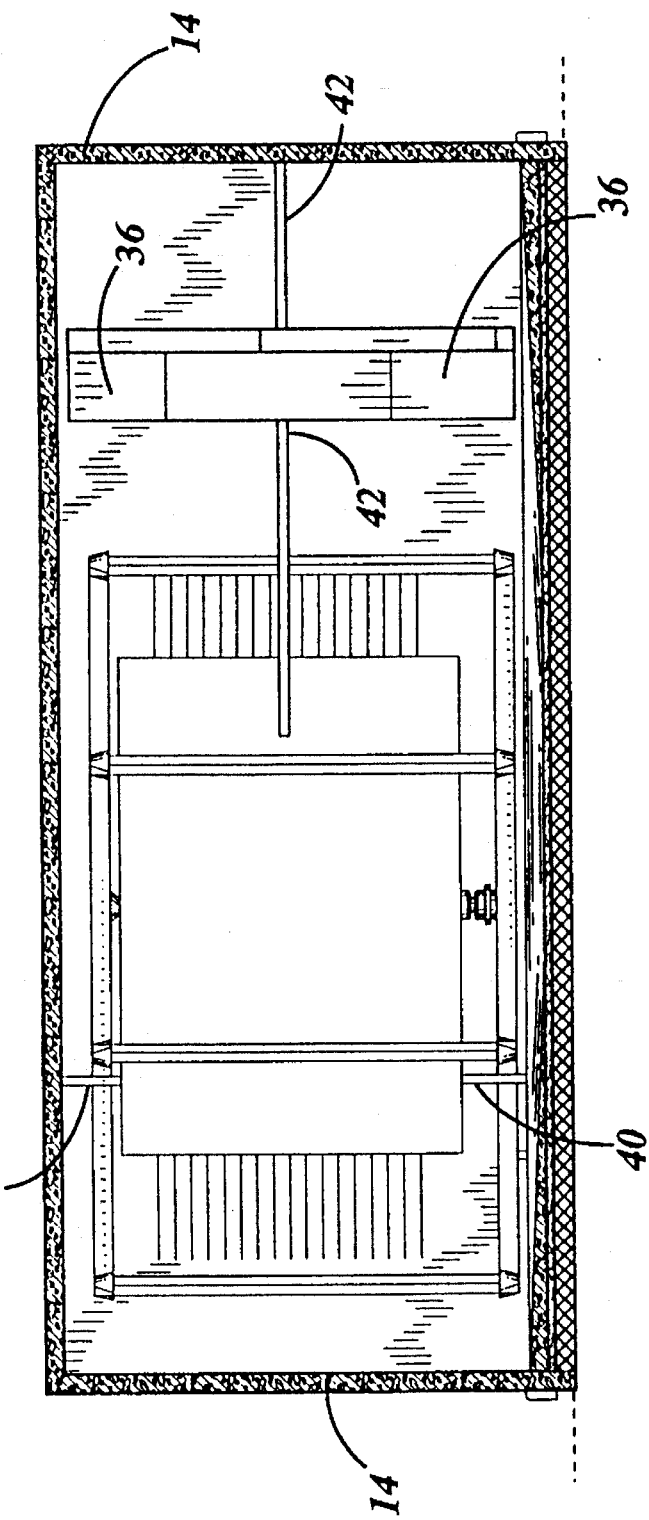

Fig.6b

VALVE POSITION TABLE

| VALVE | REFRIGERATION | DEFROST |
|---|---|---|
| A | OPEN | CLOSED |
| B | OPEN | CLOSED |
| C | CLOSED | OPEN |
| D | CLOSED | OPEN |

AIRFLOW AND DEFROSTING SYSTEM FOR REFRIGERATION SYSTEMS AND APPARATUS

BACKGROUND OF THE INVENTION

I. Field of the Invention

This invention relates generally to freezers used in the manufacture and storage of food items. More particularly, this invention relates to such a freezing system for continuous automated freezing of food items, wherein cooling coils of the freezing system may be defrosted without interrupting the continuous automated freezing and without interrupting production of the food items.

II. Discussion of the Related Art

Blast freezing systems have been used in the past in food manufacturing operations. Such blast freezing systems require a constant temperature in the range of −30° F. A refrigeration system of this type cannot maintain operation at this temperature without constant cooling from the cooling coils. At the low temperatures of this type of refrigeration system, any moisture within the system tends to build up and freeze on the cooling coils. When the layer of frost becomes too thick on the cooling coils, the coils no longer operate effectively to cool the system. Hence the cooling coils must periodically be defrosted.

With the prior art, blast freezing system's refrigeration coils may be required to be defrosted as often as several times a day. Defrosting the coils can take from one to four hours. With many such systems, manufacture of food products must cease during these defrost cycles because there is no way to immediately freeze the food product for storage.

One approach previously adopted to improve plant efficiency was to reduce the length of the defrost cycle of the blast freezing system. A common method of reducing the time required to defrost the cooling coils is the hot gas method. When the hot gas method is used, warm refrigerating gas, instead of the cold liquid, is pumped through the coils to warm the coils. The hot gas melts the ice and frost off the coils. One such hot gas defrost refrigeration system is disclosed by Lammert in U.S. Pat. No. 5,056,327. Another hot gas defrost system for refrigeration systems is disclosed by Gregory in U.S. Pat. No. 5,157,935.

The hot gas method reduces the duration of the defrost cycle. However, production must still cease during the defrost cycle. Therefore, it is desirable to have a freezing system which can be effectively defrosted and still permit food production to continue 24 hours a day. This can best be achieved by a system, such as the one contemplated by the present invention, which includes a plurality of cooling units or freezing systems constantly providing cold air to the system. The cooling units are sequentially defrosted so that, as one cooling unit is defrosted, the other cooling units continue refrigeration. The successful design of such a system requires that the defrosting coil of the associated cooling unit be isolated from the other cooling units and from the cold air produced by the other cooling units. Also, the chilled air generated by the cooling units remaining on-line must be sufficient to quickly freeze the food (i.e., −20° F. to −30° F.).

Louver arrangements used to isolate the defrosting coils require undue, expensive, and time consuming maintenance. Any such louver arrangement would require external power, additional programming, additional wiring, and frequent maintenance of moving parts. More importantly, moisture and frost would tend to collect on the louver arrangement constricting movement of the louvers and, thereby requiring additional defrost mechanisms on the louvers, to successfully use the louvers to isolate the coils as they are defrosted.

The present invention overcomes these disadvantages by providing a sequential defrost system and apparatus that may operate 24 hours a day, wherein the cooling units are isolated, without the use of louvers, thereby eliminating the requirements of external power, additional programming, additional wiring, or maintenance of moving parts.

SUMMARY OF THE INVENTION

The purpose of the present invention is to provide a system and apparatus for freezing foods in mass production 24 hours a day. The system allows continuous production during normal defrosting of the cooling units. Also, the system does not require movable louvers or the associated external power, additional programming, additional wiring, or maintenance of moving parts.

The apparatus of the present invention includes an enclosure preferably having parallel spaced insulated sides, parallel spaced insulated ends, an insulated floor, an insulated ceiling, an ingress opening, an egress opening, and a cooling system. The apparatus also includes a conveyor belt which brings a product into the freezer system through the ingress opening. To efficiently utilize space, the conveyor belt spirals within the freezing chamber of the enclosure. The conveyor belt later exits the enclosure, through the egress opening, after the product has been sufficiently freeze processed.

The apparatus also includes a plurality of vertical and horizontal stationary baffles within the enclosure. In one embodiment, the enclosure and the baffles cooperate to form four independent airflow passages and a freezing chamber. The cooling system is comprised of several cooling units. Associated with each passage is a cooling unit which includes a set of coils, a set of refrigerant and defrost control valves, and at least one air circulating fan. Those skilled in the art will appreciate that various means may be used to circulate refrigerant through the coils of all the cooling units. The fans are positioned in the airflow passageway and cooperate with the cooling coils to create a cold flow of circulating air within the enclosure. The cool air (−30° F.) circulates past the conveyor system freezing the food and then back to the cooling units and fans.

Finally, the apparatus includes a microprocessor based controller which monitors and governs operation of the fans and control valves. When coils of a cooling unit becomes frost covered and inefficient, the controller initiates a hot gas defrost cycle on that coil, by turning off the fans and circulating hot fluids through the coil. The horizontal and vertical baffles isolate each airflow passage of the cooling system so that each cooling unit may be defrosted independently and sequentially. By defrosting the coils independently and sequentially, the freezing process may run 24 hours a day for several days without interruptions or a decrease in the output efficiency of the cooling system.

The baffles isolate each cooling unit so that during the hot gas defrost cycle, the cool air from all operating cooling units does not defeat the hot gas defrost cycle of the remaining unit. Likewise, the heat used to defrost the coil of the cooling unit is isolated from the remainder of the system so that it does not interfere with freezing of the food. The baffles are sealed so that the airflow is effectively isolated to each independent passage. The horizontal baffles are easily cleaned and only a minimum amount of frost collects on the baffles. Further, the horizontal and vertical baffles do not require external power, additional programming, additional wiring, or maintenance because they have no moving parts.

It is accordingly a principal object of the present invention to provide a sequential defrost system having independent cooling units that may be defrosted individually without affecting the effectiveness of the other cooling units.

Another object of the present invention is to provide a sequential defrost system that isolates each cooling unit, without moving parts.

A further object of the present invention is to provide a sequential defrost system that is not dependent on the configuration of the conveyor assembly.

Still a further object of the present invention is to provide a sequential defrost system having independent isolated cooling units, whereby the isolating means does not prevent easy cleaning of the cooling coils of each cooling unit.

Yet another object of the present invention is to provide a sequential defrost system that is more cost effective in isolating the independent cooling units.

Another object of the present invention is to provide a sequential defrost system, whereby independent isolated cooling units may be defrosted in sequence while maintaining the desired cooling output.

Still a further object of the present invention is to provide an airflow and defrosting system which allows the freezing process to be maintained 24 hours a day without interruptions from the defrost cycle.

These and other objects, as well as these and other features and advantages of the present invention will become readily apparent to those skilled in the art from a review of the following detailed description of the preferred embodiment in conjunction with the accompanying drawings and claims.

DESCRIPTION OF THE DRAWINGS

FIG. 5 is a cross-sectional view through line 5—5 of FIG. 4.

FIG. 6b is a table describing the position of the valves when the cooling unit of FIG. 6a is refrigerating and when it is defrosting.

DETAILED DESCRIPTION OF THE PREFERRED EMBODIMENT

Figure 1:
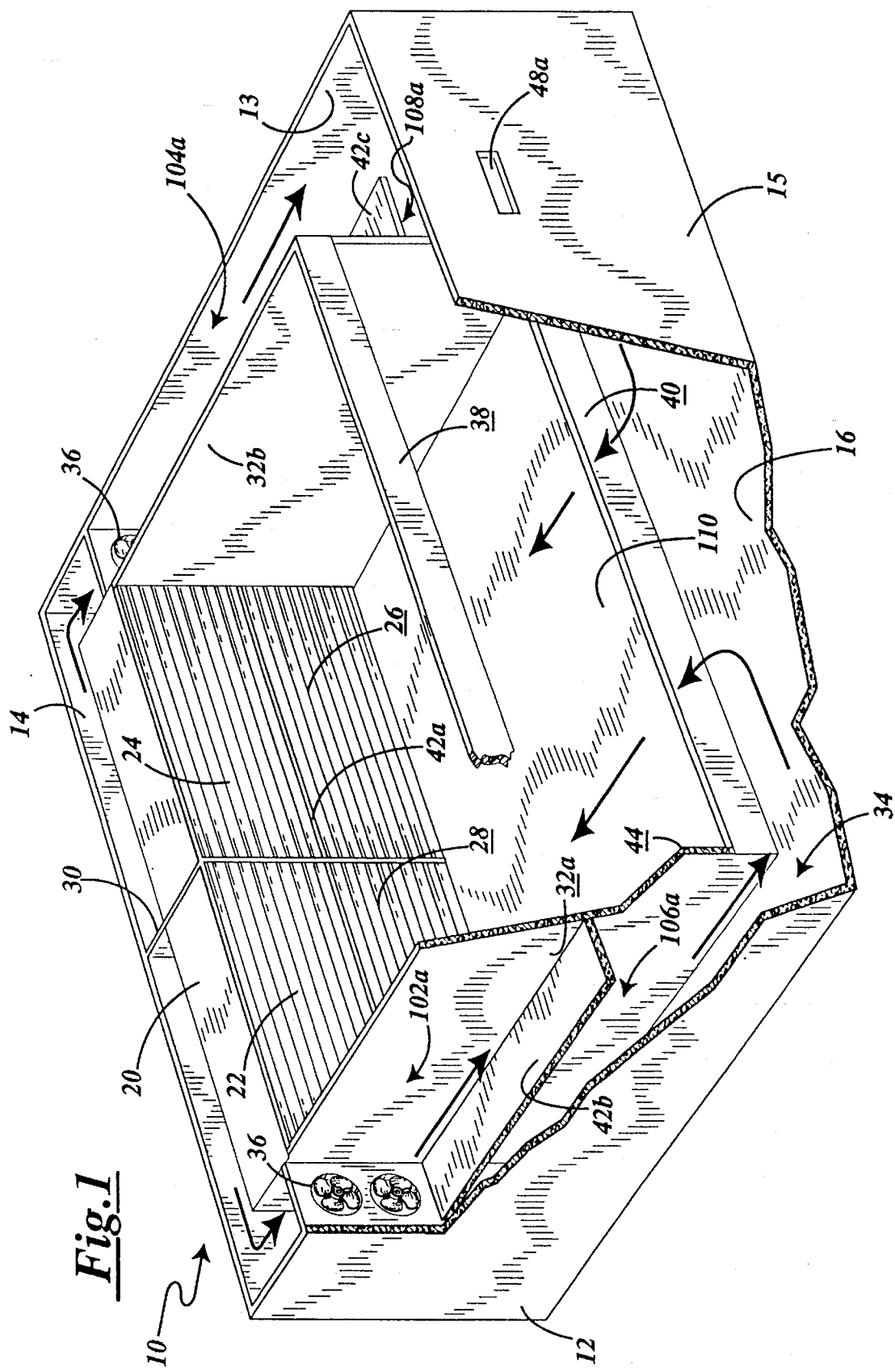
FIG. 1 is a partial sectional perspective view of the freezing enclosure with the conveying system, and freezing chamber baffle 200 removed.

Referring first to FIG. 1, there is indicated generally the freezing enclosure 10 and a cooling system 20. The freezing enclosure 10 consists generally of insulated sidewalls 12 and 13, insulated endwalls 14 and 15, an insulated floor 16 and an insulated ceiling 18 (see FIG. 3).

Located within the freezing enclosure 10 are a plurality of vertical insulated baffles 30, 32a and 32b. Vertical baffle 30, extends from, and is sealably attached to, the floor 16 to the ceiling 18. Baffle 30 projects inwardly from the center of the end wall 14 through the center of the cooling system 20. The vertical baffle 30 divides the cooling system into a right half and a left half. Vertical side baffles 32a and 32b extend from the floor 16 to the ceiling 18, parallel to the enclosure's sidewalls 12 and 13 and perpendicular to the cooling system 20. The vertical side baffles 32a and 32b are sealably attached to the ends of the cooling system 20.

Also located within the freezing enclosure are a plurality of horizontal baffles 42a, 42b and 42c. Horizontal baffle 42a extends perpendicularly inward from the endwall 14 towards the cooling system 20, between sidewalls 12 and 13 of freezing enclosure 10. Horizontal baffle 42a also extends horizontally through the center of the cooling system 20 dividing the cooling system 20 into an upper half and a lower half. Horizontal baffle 42b extends between sidewall 12 and vertical sidewall baffle 32a at the same height as horizontal baffle 42a. Likewise, horizontal baffle 42c extends between sidewall 13 and vertical baffle 32b, at the same height as horizontal baffle 42a. It should be noted that the baffles 32a, 32b, 42b and 42c do not extend all the way to the end wall 15. These baffles all generally extend the same distance toward the endwall 15, at least past the center point of the conveyor system 100.

Given the configuration of the baffles 30, and 42a, those skilled in the art will recognize that the cooling system is effectively divided into four cooling units 102, 104, 106 and 108. The baffles and sidewalls of the freezing enclosure 10 further cooperate to form separate airflow passages (102a, 104a, 106a, and 108a) for each cooling unit of the cooling system 20. The cooling system 20, and the vertical sidewall baffles 32a and 32b also cooperate to form a freezing chamber 110.

Figure 6A:
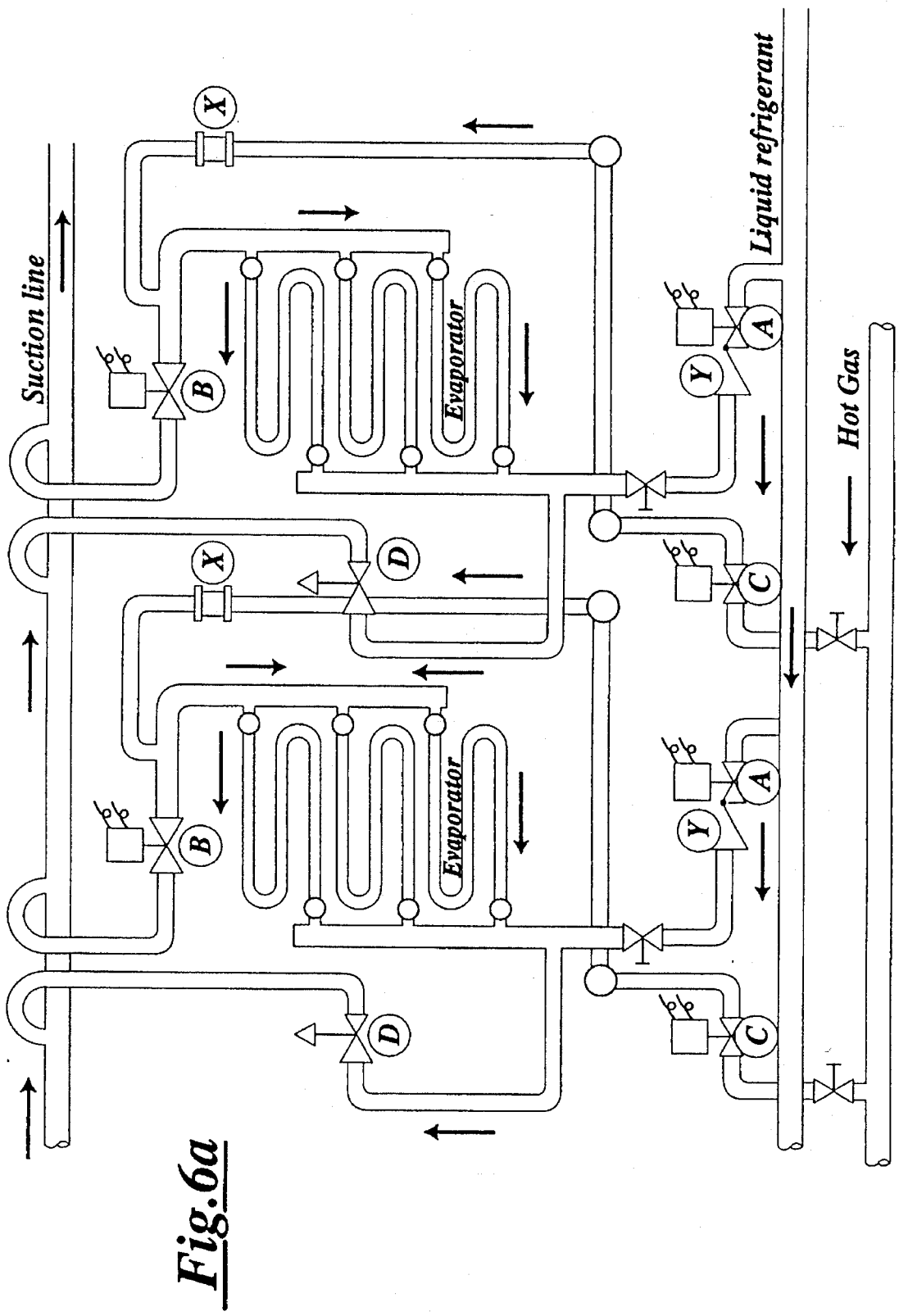
FIG. 6a is a schematic diagram showing the valving arrangement of the cooling units of the present invention.

Each cooling unit of the cooling system 20 is capable of operating separately and independently although air mixes freely in the freezing chamber 110. Each cooling unit has its own set of cooling coils 22, 24, 26, or 28 and its own refrigerant control valves (see FIG. 6a). The control valves are used to circulate a coolant through coils of the cooling unit during the freezing cycle and hot fluid through the coils due to compressor pressure during the defrost cycle.

The cooling coils of each cooling unit set are arranged in rows. The coils in all but the two rows closest to the freezing chamber 110 have fins which help disperse the cold (or heat) from within the coils. The two rows closest to the freezing chamber 110 do not have fins. These two rows of coils act as an isolating structure for the other rows of coils. If the outer two rows of coils had fins, the tips of the fin would not completely defrost during the defrost cycle, because of the direct contact of the cool air cycling towards the other operable cooling coils. These two rows also provide the cooling unit with a capacity to collect large amounts of frost without restricting air flow. The fins of the cooling coils isolated by the first two rows of coils defrost completely during the defrost cycle. Each cooling unit also has its own fan or set of fans for moving or drawing air through the coils of the cooling unit to chill the air. The fans circulate the chilled air through the associated passage towards the food freezing chamber 110.

Figure 2:
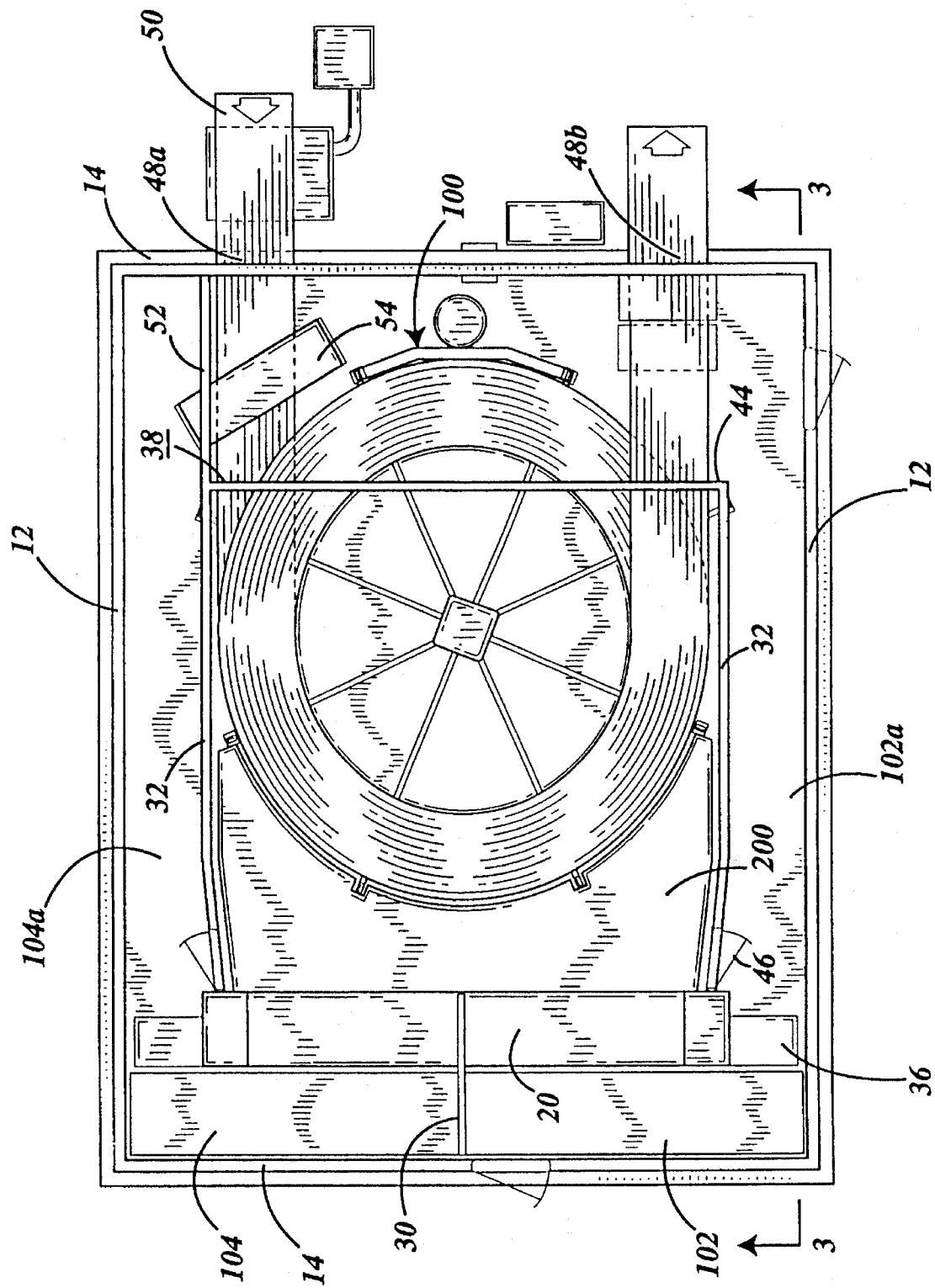
FIG. 2 is a partial sectional top view of the freezing enclosure of the type shown in FIG. 1.
Figure 3:
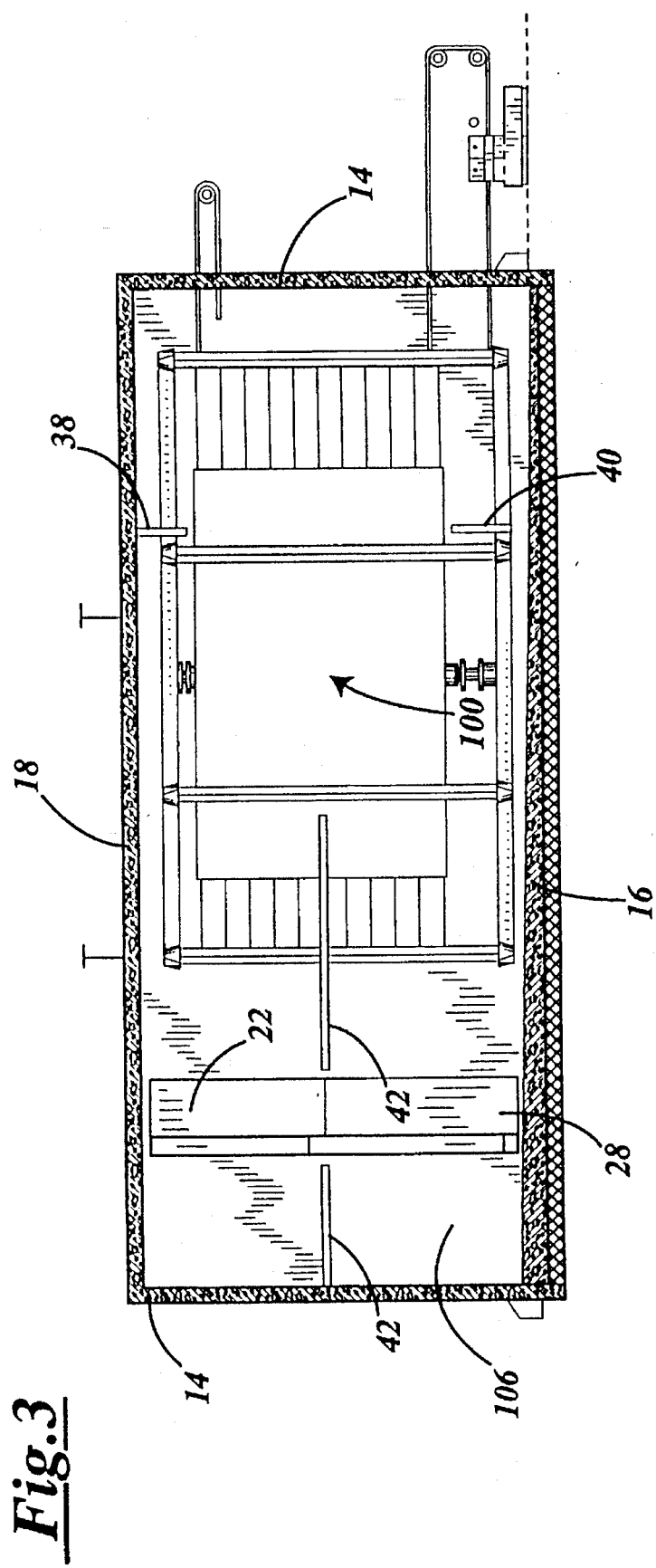
FIG. 3 is a cross-sectional view through line 2—2 of FIG. 2.
Figure 4:
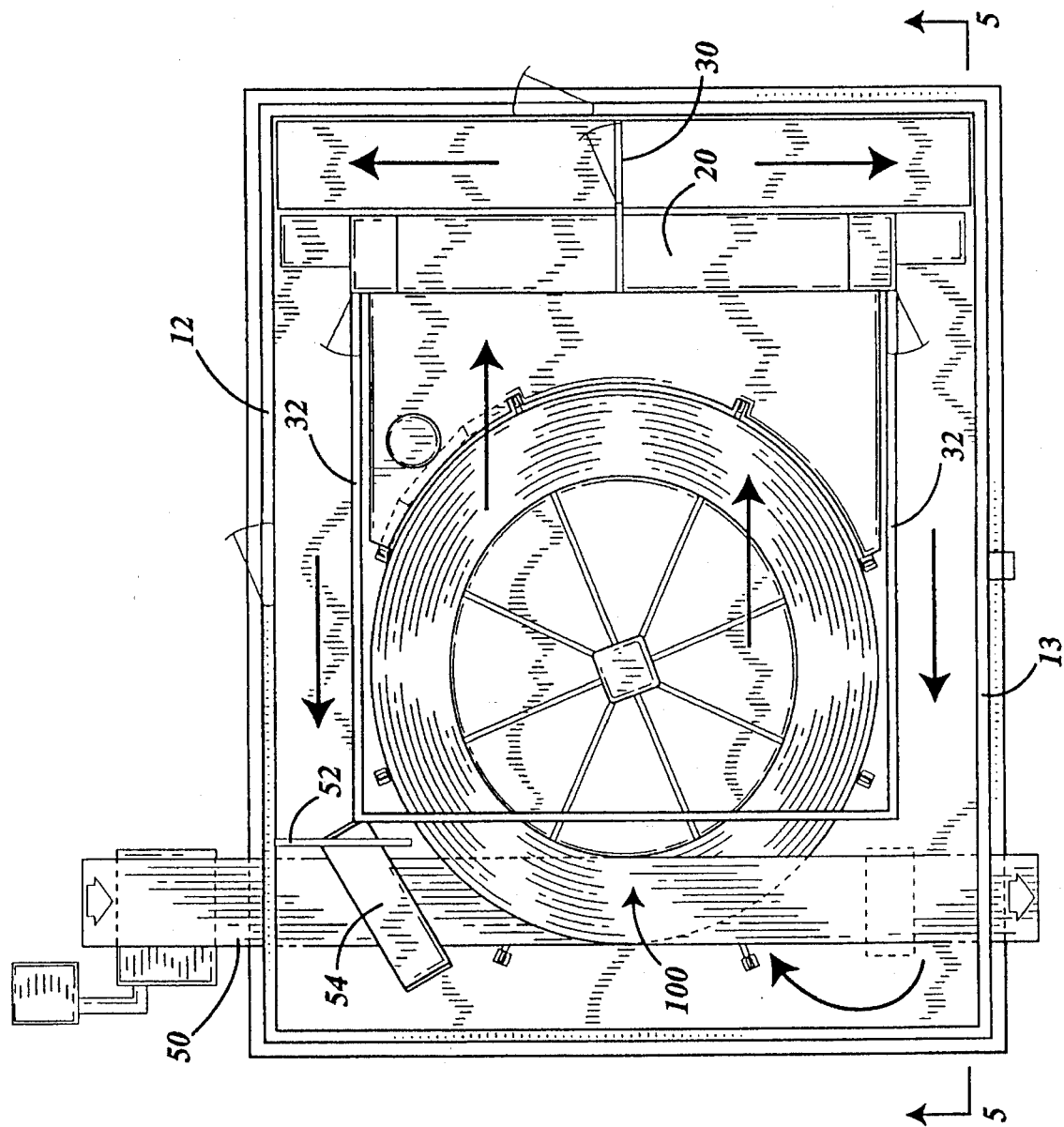
FIG. 4 is a partial sectional top view of an alternate preferred freezing enclosure of the type shown in FIG. 1, showing the entry and exit of the conveyor system in alternate locations.

Referring next to FIGS. 2 and 3, a freezing enclosure 10 is shown with a conveyor system 100 in place in the freezing chamber 110. The conveyor system is similar to spiral freezing systems that are available from Northfield Freezing Systems, Inc. A conveyor belt 50 enters into the freezing enclosure 10 through the conveyor system ingress opening 48a. The conveyor belt spirals up several layers and then exits through the conveyor egress opening 48b. The direction of spiral is not critical. Likewise, the openings 48a and 48b may serve interchangeably as either the ingress or egress. The ingress and egress may both be positioned on endwall 15 as shown in FIGS. 2 and 3. Alternatively, the ingress and egress may be positioned on sidewalls 12 and 13 as shown in FIGS. 4 and 5. A horizontal freezing chamber baffle 200 (shown in FIG. 2) extends from the cooling system 20 inward towards the conveying system 100. The freezing chamber baffle 200 further directs the return airflow to specific cooling units. A conveyor baffle 52 is provided to direct the turbulent airflow away from the conveyor belt as the conveyor belt enters the freezing system. A walkway 54 is provided that allows the user to easily maneuver over the conveyor belt 50.

In addition to those described above, the preferred embodiment may also include additional support and directional baffles. Also, the system may include several other doors. For example, a ceiling baffle 38 extends down from the ceiling 18. The ceiling baffle 38 extends down to a height that is slightly higher than the highest spiral of the conveyer system 100. A floor baffle 40 extends up from the floor 16. The floor baffle 40 extends up to a height slightly less than lowest spiral of the conveyor system 100. The ceiling baffle 38 and floor baffle 40 connect the parallel spaced vertical baffle sides 32 at the end 44 of each vertical baffle side 32. A door 46 (shown in FIG. 2) may be located on the vertical baffle sidewall 32a and 32b, whereby the horizontal baffle 42a or 42b may be easily cleaned.

Operation of the control valves serving independent cooling unit coils 22, 24, 26, and 28, and the associated fans may be controlled either automatically by a microprocessor based control system or manually. The control system can be programmed to monitor the condition of the coils of each cooling unit or to defrost at predetermined time intervals. When defrosting is required, the control system will shut down the fans 36 of the cooling unit to be defrosted and then start the defrost cycle for the coil in that cooling unit by causing the hot fluid to circulate through the coils. With various sensors the microprocessor may be programmed to determine when the defrost cycle is complete. The microprocessor, at the same time, can increase the cooling output of the remaining cooling units to compensate for the cooling unit being defrosted. See FIGS. 6a and 6b. The controller will only permit one cooling unit to be defrosted at a time.

In a typical freezing enclosure, the temperature should remain at −30 degrees Fahrenheit for a consistent freeze process. By using baffles 42a, 42b, 42c, 30, 32a and 32b to isolate the cooling units, the system may run 24 hours a day without a noticeable change in cooling output and without defeating the defrost cycle of each unit. The microprocessor may also control the speed that the conveyor system 100 carries the product through the freezing enclosure 10. Depending on the product to be frozen, the conveyor belt speed may be increased or decreased.

Having described the apparatus of the present invention its operation will now be discussed. Referring to FIGS. 1 and 4, arrows are shown which represent the direction of airflow in the freezing enclosure 10. The user starts the freezing process by placing a product on the conveyor belt 50. The conveyor belt 50 enters the freezing enclosure 10 and freezing chamber 110. The conveyor then spirals several times and exits the freezing chamber 110 and freezing enclosure 10. As the product is conveyed through the freezing chamber 110, cold air in the range of −30° F. continuously circulates over the product, thereby freezing the product.

As production continues, the severe, cold temperatures will cause residual moisture to condense and freeze on the coils of each cooling unit 22, 24, 26, and 28. Thus, the coils must be defrosted to avoid ineffectiveness of the coils. A defrost cycle can be initiated under computer control or manually. Either way, the fans 36, of the cooling unit to be defrosted, are turned off to reduce or eliminate airflow over the coils of that cooling unit. The control valves then allow hot fluids to circulate through the coils, defrosting the coils of the particular cooling unit, while the other cooling units continue to produce cold air and freeze the food on the conveyor belt in the freezing chamber 110. The cooling output of the coils in the remaining cooling units is sufficient to keep the overall cooling output in the freezing chamber 110 constant at between −25° F. and −30° F.

When the defrost cycle for the cooling unit is complete, coolant is again circulated through the coils, the fans 36 are turned on, and the coils begin again to contribute to the cooling output. The coils of the remaining independent cooling units may be defrosted in sequence in a similar manner.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. An apparatus for freezing edible foods with subzero temperatures comprising:

(a) an insulated enclosure including a ceiling, a floor, sidewalls, and endwalls;

(b) baffles, forming in conjunction with the insulated enclosure, a plurality of independent airflow passages and a freezing chamber within the enclosure;

(c) an independently operable cooling unit associated with each airflow passage, each cooling unit having its own set of cooling coils, set of control valves, and at least one fan for moving air over the coils and out of the passage into the freezing chamber, each said cooling unit being isolated from each other cooling unit by said baffles;

(d) a conveying means entering and exiting the freezing chamber of said enclosure, whereby said conveying means conveys the edible foods into and out of said freezing chamber; and (e) control means for independently operating the control valves and fans of each said cooling unit so that said coils of said cooling unit can be sequentially defrosted while a sufficiently low temperature is maintained in the freezing chamber so that freezing of edible foods can continue while one of said cooling units is defrosted.

2. An apparatus as recited in claim 1 wherein said baffles direct cold air toward said conveying means through said plurality of independent airflow passages.

3. An apparatus as recited in claim 1 wherein the number of airflow passages formed by said baffles is at least four.

4. An apparatus as recited in claim 1 wherein each set of cooling coils may be sequentially defrosted by circulating hot fluids through said set of cooling coils, wherein a middle portion of each said set of cooling coils have fins extending therefrom.

5. An apparatus for freezing edible foods with subzero temperatures comprising:
   (a) an enclosure including a ceiling, a floor, sidewalls, and endwalls;
   (b) vertical and horizontal baffles located within said enclosure and, forming within the enclosure, at least four independent airflow passages and at least one freezing chamber within said enclosure;
   (c) an independent cooling unit for each independent airflow passage, each cooling unit including a set of cooling coils, a set of control valves, and at least one fan, wherein said control valves permit refrigerant to be circulated through said cooling coils when said cooling coils are chilling air, and wherein said control valves permitted heated fluids to circulate through the coils when the coils are defrosting, and wherein said fan circulates air over said cooling coils as refrigerant is circulated through said cooling coils, and through said airflow passage to said freezing chamber;
   (d) conveying means entering and exiting said enclosure and said freezing chamber, whereby said conveying system spirals through said freezing chamber, conveying the edible foods into and out of said freezing chamber and said enclosure; and
   (e) control means for governing operation of said control valves and fans of each cooling unit so that the cooling coils of the separate cooling units can be defrosted sequentially by turning the fan off and circulating heated fluids into the set of cooling coils to defrost said coils.

6. An apparatus as recited in claim 5 wherein each separate set of cooling coils may be defrosted independently, using a hot gas, without affecting the effectiveness of remaining separate sets of cooling coils.

7. A method of freezing edible foods with subzero temperatures comprising the steps of:
   (a) providing a fully insulated enclosure including a ceiling, a floor, sidewalls, and endwalls for freezing products;
   (b) providing, within the enclosure, baffles to form a plurality of independent airflow passages and a freezing chamber;
   (c) providing an independent cooling unit for each of said independent airflow passages, each cooling unit including a set of coils, valve means, and fan means; said valve means for permitting refrigerant to circulate through the coils when performing freezing operations and for permitting heated fluid to circulate through the coils when performing the defrost operation; said fan means for moving air over coils, through the airflow passage, and to the freezing chamber when the cooling unit is performing the freezing operation;
   (d) providing control means for controlling said valve means and fan means of each of said independent cooling units to permit one of said set of coils of said independent cooling units to be defrosted separately from the coils of the other independent cooling units, thereby maintaining a temperature in the freezing chamber sufficiently low to freeze edible foods;
   (e) providing automatic conveying means for conveying said edible foods into said insulated enclosure, moving said food into said freezing chamber, where it is frozen, and, after the food is frozen, conveying said edible food from said freezing chamber and said insulated enclosure.

8. An apparatus for freezing edible foods with subzero temperatures comprising:
   (a) an insulated enclosure including a ceiling, a floor, sidewalls, and endwalls;
   (b) vertical baffles extending from said floor to said ceiling, thereby forming in conjunction with the insulated enclosure, at least two independent airflow passages and a freezing chamber within the enclosure, said freezing chamber being partially enclosed by a portion of said vertical baffles;
   (c) horizontal baffles attached and extending between said vertical baffles and said sidewalls, and extending from one of said endwalls to said vertical baffle, thereby further dividing said airflow passages;
   (d) an independently operable cooling unit associated with each airflow passage, each cooling unit having its own set of cooling coils, set of control valves, and at least one fan for moving air over the coils and out of the passage into the freezing chamber, each said cooling unit being isolated from each other cooling unit by said vertical and horizontal baffles;
   (e) a conveying means entering and exiting the freezing chamber of said enclosure, whereby said conveying means conveys the edible foods into and out of said freezing chamber; and
   (f) control means for independently operating the control valves and fans of each said cooling unit so that said coils of said cooling unit can be sequentially defrosted while a sufficiently low temperature is maintained in the freezing chamber so that freezing of edible foods can continue while one of said cooling units is defrosted.

9. An apparatus as recited in claim 8, wherein a portion of the horizontal baffle, which extends from said endwall, further extends through said vertical baffle into a portion of said freezing chamber.

10. An apparatus as recited in claim 8, further comprising directional baffles extending between said vertical baffles, wherein said directional baffles further directs the flow of air into the freezing chamber.

* * * * *